United States Patent
Li (10) Patent No.: US 11,011,124 B2
(45) Date of Patent: May 18, 2021

(54) METHOD AND DEVICE FOR ADJUSTING CURRENT OF BACKLIGHT, AND STORAGE MEDIUM

(71) Applicant: Beijing Xiaomi Mobile Software Co., Ltd., Beijing (CN)

(72) Inventor: Guosheng Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 72 days.

(21) Appl. No.: 15/903,260

(22) Filed: Feb. 23, 2018

(65) Prior Publication Data

US 2018/0254014 A1    Sep. 6, 2018

(30) Foreign Application Priority Data

Mar. 6, 2017   (CN) .......................... 201710128732.2

(51) Int. Cl.
*G09G 3/36* (2006.01)
*G06F 3/041* (2006.01)
(Continued)

(52) U.S. Cl.
CPC ..... *G09G 3/3648* (2013.01); *G02F 1/133602* (2013.01); *G06F 3/041* (2013.01);
(Continued)

(58) Field of Classification Search
CPC ............... G09G 3/3648; G09G 3/3406; G09G 2320/041; G09G 2320/0606;
(Continued)

(56) References Cited

U.S. PATENT DOCUMENTS 6,388,388 B1 * 5/2002 Weindorf ............. G09G 3/3406
                                                         315/157
7,042,434 B2 * 5/2006 Woo ..................... G06F 1/3203
                                                         345/101
(Continued)

FOREIGN PATENT DOCUMENTS

CN        1909049 A      2/2007
CN       101206827 A     6/2008
(Continued)

OTHER PUBLICATIONS

Extended European Search Report issued in corresponding European Application No. 17192937.5, dated Feb. 2, 2018, 10 pages.
(Continued)

*Primary Examiner* — Michael J Jansen, II
(74) *Attorney, Agent, or Firm* — Arch & Lake LLP (57) ABSTRACT

A method and a device are provided for adjusting a current of a backlight. The method includes: when a present first current value of the current of the backlight reaches a first preset threshold, detecting a preset mode used to adjust the current of the backlight; determining a reference value corresponding to the preset mode; and when the reference value reaches a second preset threshold, controlling the current of the backlight to reduce to a second current value from the first current value, and controlling the current of the backlight to keep the second current value for a preset period corresponding to the second current value, in which the second current value is greater than the first preset threshold.

15 Claims, 6 Drawing Sheets

(51) Int. Cl.
*G02F 1/13357* (2006.01)
*G09G 3/34* (2006.01)

(52) U.S. Cl.
CPC ..... *G09G 3/3406* (2013.01); *G09G 2320/041* (2013.01); *G09G 2320/0606* (2013.01); *G09G 2330/021* (2013.01); *G09G 2360/16* (2013.01)

(58) Field of Classification Search
CPC .......... G09G 2330/021; G09G 2360/16; G02F 1/133602; G06F 3/041
See application file for complete search history.

(56) References Cited

U.S. PATENT DOCUMENTS

| | | | | |
|---|---|---|---|---|
| 7,120,808 B2* | 10/2006 | Miyairi | ............... | G06F 1/3203 713/322 |
| 7,391,171 B2* | 6/2008 | Kim | ............... | G09G 3/3406 315/149 |
| 8,054,386 B2* | 11/2011 | Kim | ............... | G09F 9/35 348/553 |
| 8,125,163 B2* | 2/2012 | Dunn | ............... | H05B 37/0218 315/307 |
| 8,228,355 B2* | 7/2012 | Sasaki | ............... | G09G 3/3406 345/101 |
| 8,237,651 B2* | 8/2012 | Hasegawa | ............... | G09G 3/3233 345/101 |
| 8,432,107 B2* | 4/2013 | Chiu | ............... | G09G 3/3406 315/291 |
| 8,569,910 B2* | 10/2013 | Dunn | ............... | H05B 45/22 307/31 |
| 8,654,068 B2* | 2/2014 | Aitken | ............... | G09G 3/3406 345/102 |
| 8,692,759 B2* | 4/2014 | Park | ............... | G09G 3/3426 345/102 |
| 8,896,895 B2* | 11/2014 | Kawai | ............... | H04N 1/00819 358/406 |
| 8,942,770 B2* | 1/2015 | Kim | ............... | H04M 1/22 455/566 |
| 9,129,563 B2* | 9/2015 | Atkinson | ............... | G02F 1/1336 |
| 9,262,968 B2* | 2/2016 | Takayanagi | ............... | G09G 3/3406 |
| 9,357,207 B2* | 5/2016 | Park | ............... | G09G 3/36 |
| 9,459,141 B2* | 10/2016 | Lin | ............... | G01K 13/00 |
| 9,502,001 B2* | 11/2016 | Kim | ............... | G09G 5/10 |
| 9,691,332 B2* | 6/2017 | Li | ............... | G09G 3/3406 |
| 9,699,861 B2* | 7/2017 | Ohno | ............... | H05B 37/02 |
| 9,773,460 B2* | 9/2017 | Verbeure | ............... | G09G 3/3406 |
| 9,867,253 B2* | 1/2018 | Dunn | ............... | G09G 3/36 |
| 9,966,012 B2* | 5/2018 | Hoshino | ............... | G09G 3/3406 |
| 9,984,657 B2* | 5/2018 | Cai | ............... | G09G 5/024 |
| 10,217,420 B2* | 2/2019 | Jang | ............... | G09G 3/3413 |
| 10,380,951 B2* | 8/2019 | Zhang | ............... | G06F 3/02 |
| 10,665,181 B2* | 5/2020 | Albrecht | ............... | G06F 1/1643 |
| 10,670,914 B2* | 6/2020 | Zhang | ............... | G09G 3/36 |
| 2003/0043106 A1 | 3/2003 | Woo | | |
| 2004/0133816 A1* | 7/2004 | Miyairi | ............... | G06F 1/3203 713/300 |
| 2005/0151717 A1* | 7/2005 | Seo | ............... | G09G 3/3406 345/102 |
| 2006/0267922 A1* | 11/2006 | Kim | ............... | G09G 3/3406 345/102 |
| 2006/0273742 A1* | 12/2006 | Kim | ............... | G09G 3/3406 315/308 |
| 2007/0029950 A1 | 2/2007 | Jang et al. | | |
| 2007/0120772 A1* | 5/2007 | Kim | ............... | G09F 9/35 345/63 |
| 2008/0143652 A1* | 6/2008 | Hasegawa | ............... | G09G 3/3233 345/77 |
| 2009/0027327 A1* | 1/2009 | Urisu | ............... | G09G 3/3611 345/101 |
| 2009/0109166 A1* | 4/2009 | Lee | ............... | G09G 3/3426 345/102 |
| 2009/0261757 A1* | 10/2009 | Wu | ............... | G09G 3/3406 315/307 |
| 2009/0289580 A1* | 11/2009 | Dunn | ............... | H05B 47/10 315/307 |
| 2009/0289965 A1* | 11/2009 | Kurokawa | ............... | G09G 3/3406 345/690 |
| 2010/0053449 A1* | 3/2010 | Tomita | ............... | G09G 3/3413 386/254 |
| 2010/0171690 A1* | 7/2010 | Park | ............... | G09G 3/3413 345/102 |
| 2010/0237697 A1* | 9/2010 | Dunn | ............... | G06F 1/3265 307/31 |
| 2011/0051128 A1 | 3/2011 | Horibe | | |
| 2011/0080431 A1* | 4/2011 | Sasaki | ............... | G09G 3/3406 345/690 |
| 2011/0096105 A1* | 4/2011 | Park | ............... | G09G 3/36 345/690 |
| 2011/0193872 A1* | 8/2011 | Biernath | ............... | G09G 3/3406 345/589 |
| 2012/0075536 A1* | 3/2012 | Uehara | ............... | G09G 3/2025 348/731 |
| 2012/0139885 A1* | 6/2012 | Iwasa | ............... | G09G 3/3426 345/207 |
| 2012/0229047 A1* | 9/2012 | Chiu | ............... | G09G 3/3406 315/291 |
| 2012/0270606 A1* | 10/2012 | Kim | ............... | H04M 1/22 455/566 |
| 2012/0274809 A1* | 11/2012 | Yang | ............... | H04N 5/58 348/234 |
| 2012/0310552 A1* | 12/2012 | Cheng | ............... | G01J 5/60 702/40 |
| 2013/0015770 A1* | 1/2013 | Aitken | ............... | G09G 3/3406 315/154 |
| 2013/0127699 A1* | 5/2013 | Atkinson | ............... | G02F 1/1336 345/101 |
| 2013/0162701 A1* | 6/2013 | Yang | ............... | G09G 3/3406 345/691 |
| 2013/0181612 A1* | 7/2013 | Ohno | ............... | H05B 37/02 315/151 |
| 2014/0015865 A1* | 1/2014 | Kim | ............... | G09G 5/10 345/690 |
| 2014/0098079 A1* | 4/2014 | Takayanagi | ............... | G06F 3/1423 345/207 |
| 2014/0160175 A1* | 6/2014 | Uemura | ............... | G09G 3/20 345/690 |
| 2014/0293364 A1* | 10/2014 | Kawai | ............... | H04N 1/00819 358/406 |
| 2015/0109286 A1* | 4/2015 | Verbeure | ............... | G09G 3/3406 345/419 |
| 2015/0262548 A1* | 9/2015 | Lin | ............... | G01K 13/00 345/589 |
| 2016/0037606 A1* | 2/2016 | Dunn | ............... | G09G 3/36 349/61 |
| 2016/0063927 A1* | 3/2016 | Li | ............... | G09G 3/3406 315/297 |
| 2016/0155402 A1* | 6/2016 | Hoshino | ............... | G09G 3/3406 345/690 |
| 2016/0225327 A1* | 8/2016 | Jang | ............... | G09G 3/3413 |
| 2016/0322022 A1* | 11/2016 | Cai | ............... | G09G 5/024 |
| 2017/0047019 A1* | 2/2017 | Li | ............... | G09G 3/36 |
| 2017/0132988 A1* | 5/2017 | Wang | ............... | G09G 5/10 |
| 2017/0169759 A1* | 6/2017 | Jang | ............... | G06F 1/1652 |
| 2017/0345380 A1* | 11/2017 | Zhang | ............... | G09G 3/3406 |
| 2018/0061331 A1* | 3/2018 | Ikeda | ............... | G09G 3/2092 |
| 2018/0082631 A1* | 3/2018 | Chang | ............... | G09G 3/3225 |
| 2018/0196309 A1* | 7/2018 | Zhou | ............... | G02F 1/13306 |
| 2018/0246375 A1* | 8/2018 | Zhang | ............... | G09G 3/3426 |
| 2018/0254014 A1* | 9/2018 | Li | ............... | G09G 3/3406 |
| 2019/0005898 A1* | 1/2019 | Albrecht | ............... | G06F 1/1643 |

FOREIGN PATENT DOCUMENTS

| | | |
|---|---|---|
| CN | 101425278 A | 5/2009 |
| CN | 102193223 A | 9/2011 |
| CN | 102422342 A | 4/2012 |

(56) References Cited

FOREIGN PATENT DOCUMENTS

CN         105913812 A      8/2016
EP          1220192 A2      7/2002

OTHER PUBLICATIONS

First Office Action issued to Chinese Patent Application No. 201710128732.2, dated Jul. 10, 2019 with English translation, (25p).
Office Action issued to European Patent Patent Application No. 17192937.5 dated Feb. 6, 2020, (8p).

* cited by examiner

METHOD AND DEVICE FOR ADJUSTING CURRENT OF BACKLIGHT, AND STORAGE MEDIUM

CROSS-REFERENCE TO RELATED APPLICATION

This application is based upon and claims priority to Chinese Patent Application Serial No. 201710128732.2, filed with the State Intellectual Property Office of P. R. China on Mar. 6, 2017, the entire content of which is incorporated herein by reference.

TECHNICAL FIELD

The present disclosure generally relates to an electronic technology field, and more particularly, to a method and a device for adjusting a current of a backlight, and a non-transitory computer-readable storage medium.

BACKGROUND

In a display apparatus, a working current of a backlight is usually controlled in a certain range, for example, a maximum value is 20 milliamperes (mA). In a case that the working current of the backlight is too large, if a high current state lasts too long, excessive heat may be produced due to the backlight in the high current state for a long time. The excessive heat may cause a deformation of the backlight membrane and may affect a normal display of the display apparatus.

SUMMARY

In order to overcome the problem in the related art, embodiments of the present disclosure provide a method and a device for adjusting a current of a backlight, and a display apparatus, used to avoid the excessive heat produced due to the backlight in a high current state for a long time, thereby preventing backlight membrane from being deformed due to a high temperature.

According to a first aspect of the present disclosure, there is provided a method for adjusting a current of a backlight, including: when it is detected that a present first current value of the current of the backlight reaches a first preset threshold, detecting a preset mode used to adjust the current of the backlight; determining a reference value corresponding to the preset mode; and when the reference value reaches a second preset threshold, controlling the current of the backlight to reduce to a second current value from the first current value, and controlling the current of the backlight to keep the second current value for a preset period corresponding to the second current value, in which the second current value is greater than the first preset threshold.

According to a second aspect of the present disclosure, there is provided a device for adjusting a current of a backlight. The device may include: a detector, configured to detect a preset mode used to adjust the current of the backlight when it is detected that a present first current value of the current of the backlight reaches a first preset threshold; a first determining circuit, configured to determine a reference value corresponding to the preset mode detected by the detector; and a controller, configured to control the current of the backlight to reduce to a second current value from the first current value, and control the current of the backlight to keep the second current value for a preset period corresponding to the second current value, when the reference value determined by the first determining circuit reaches a second preset threshold, in which the second current value is greater than the first preset threshold.

According to a third aspect of the present disclosure, there is provided a display apparatus, including: a processor; and a memory for storing instructions executable by the processor. The processor is configured to: when it is detected that a present first current value of a current of a backlight reaches a first preset threshold, detect a preset mode used to adjust the current of the backlight; determine a reference value corresponding to the preset mode; and when the reference value reaches a second preset threshold, control the current of the backlight to reduce to a second current value from the first current value, and control the current of the backlight to keep the second current value for a preset period corresponding to the second current value, in which the second current value is greater than the first preset threshold.

According to a fourth aspect of the present disclosure, there is provided a non-transitory computer-readable storage medium having stored therein instructions that, when executed by a processor of a device, cause the processor to perform acts comprising: when it is detected that a present first current value of a current of a backlight reaches a first preset threshold, detecting a preset mode used to adjust the current of the backlight; determining a reference value corresponding to the preset mode; and when the reference value reaches a second preset threshold, controlling the current of the backlight to reduce to a second current value from the first current value, and controlling the current of the backlight to keep the second current value for a preset period corresponding to the second current value, wherein the second current value is greater than the first preset threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate aspects consistent with the invention and, together with the description, serve to explain the principles of the invention.

DETAILED DESCRIPTION

Reference will now be made in detail to aspect of the disclosures, examples of which are illustrated in the accompanying drawings. The following description refers to the accompanying drawings in which the same numbers in different drawings represent the same or similar elements unless otherwise represented. The implementations set forth in the following description of aspect of the disclosures do not represent all implementations consistent with the invention. Instead, they are merely examples of apparatuses and methods consistent with aspects related to the invention as recited in the appended claims.

Figure 1:
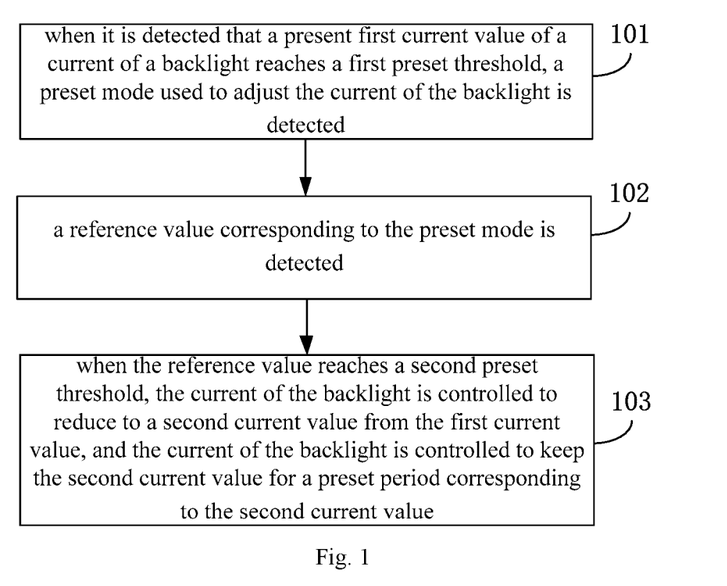
FIG. 1 is a flow chart illustrating a method for adjusting a current of a backlight according to an aspect of the disclosure.

FIG. 1 is a flow chart illustrating a method for adjusting a current of a backlight according to an aspect of the disclosure. The method for adjusting the current of the backlight may be applied to a display apparatus (such as a smart phone, a tablet computer, a smart watch, or other smart devices). Referring to FIG. 1, the method for adjusting backlight current includes followings.

At block 101, when it is detected that a present first current value of the backlight reaches a first preset threshold, a preset mode used to adjust the current of the backlight is detected. The present first current value may be detected using a current sensor electronically connected to the backlight. For example, the display apparatus may determine that the present first current value of the backlight reaches the first preset threshold when the sensed current value is greater than or equal to the first preset threshold.

In one or more embodiments, the first preset threshold may be determined by a current value of the current of the backlight controlled to be in a high-light state. For example, if a range of the current of the backlight in the high-light state is 20 mA-100 mA, the first preset threshold may be 20 mA. In one or more embodiments, the preset mode may be determined by detecting settings of the display apparatus. The settings may make a user to manually set the preset mode. The preset mode may include a temperature sensor mode and a timer mode. By setting the preset mode manually, it may ensure that the user may flexibly set a mode for adjusting luminance according to the user's using habits.

At block 102, a reference value corresponding to the preset mode is detected. The reference value may be a sensed value from one or more sensors.

In one or more embodiments, when the preset mode is the temperature sensor mode, the reference value may be a temperature value of backlight membrane detected via a temperature sensor. When the preset mode is the timer mode, the reference value may be a period that the backlight remains in the high-light state recorded by the timer.

At block 103, when the reference value reaches a second preset threshold, the current of the backlight is controlled to reduce to a second current value from the first current value, and the current of the backlight is controlled to keep the second current value for a preset period corresponding to the second current value.

In one or more embodiments, physical significance of the second preset threshold is consistent with that of the reference value. For example, when the reference value is a temperature value, the second preset threshold is a preset temperature value. When the reference value is a time period, the second preset threshold is a preset time period. In one or more embodiments, the second current value may be determined according to a temperature that the backlight membrane may withstand, and preset periods corresponding to different second current values may be obtained by experiments. For example, the first current value is 30 mA, and the second current value is 20 mA. The first current value may be in the range of 30 mA to 100 mA, or more preferably in the range of 30 mA to 50 mA. The second current value may be in the range of 10 mA to 28 mA, or more preferably in the range of 10 mA to 20 mA. If the preset period corresponding to the second current value is 30 minutes when the second current value is 20 mA, the current of the backlight may be controlled to reduce to 20 mA from 30 mA, and the backlight is in the high-light state for 30 minutes with a current of 20 mA. Here, 30 minutes is just an example and the preset period may be in the range of 20 minutes to 120 minutes.

In some embodiments, when the reference value corresponding to the preset mode reaches the second preset threshold, the current of the backlight is controlled to reduce to the second current value from the first current value, and is controlled to keep the second current value for the preset period corresponding to the second current value. It may avoid the excessive heat produced due to the backlight in a high current state for a long time, thereby preventing backlight membrane from being deformed due to a high temperature, prolonging a service life of the backlight as well as ensuring normal display of the display apparatus. In addition, because the second current value is still greater than the first preset threshold, it may make the display apparatus have a high-light backlight in a mode of a large current by reducing the current from the first current value to the second current value.

In one or more embodiments, determining a reference value corresponding to the preset mode may include followings. If the preset mode is a temperature sensor mode, a temperature value of the backlight is obtained via a temperature sensor. The temperature value is used as the reference value.

In one or more embodiments, the method may further include followings. The second current value and the preset period corresponding to the temperature value are determined from a first preset table. The first preset table is used to record correspondence relationships between current values applied to the backlight when backlight membrane is at different temperatures and lasting periods corresponding to the current values.

In one or more embodiments, determining a reference value corresponding to the preset mode may include followings. If the preset mode is a timer mode, a lasting period of the first current value is recorded by a timer. The lasting period is used as the reference value.

In one or more embodiments, the method may further include followings. The second current value corresponding to the lasting period is determined from a second preset table. The second current value is a preset value, and the second preset table is used to record correspondence relationships between current values applied to the backlight when the current of the backlight is in different lasting periods and lasting periods corresponding to the current values.

It may refer to following embodiments for how to adjust the current of the backlight.

So far, with the above mentioned method provided by embodiments of the present disclosure, it may prevent backlight membrane from being deformed or otherwise damaged due to a high temperature. Thus, the disclosed method lengthens a service life of the backlight as well as ensures a normal display of a display apparatus, and which may make the display apparatus have a high-light backlight in a mode of a large current.

Technical solutions provided by the present disclosure will be described below with reference to specific embodiments.

Figure 2A:
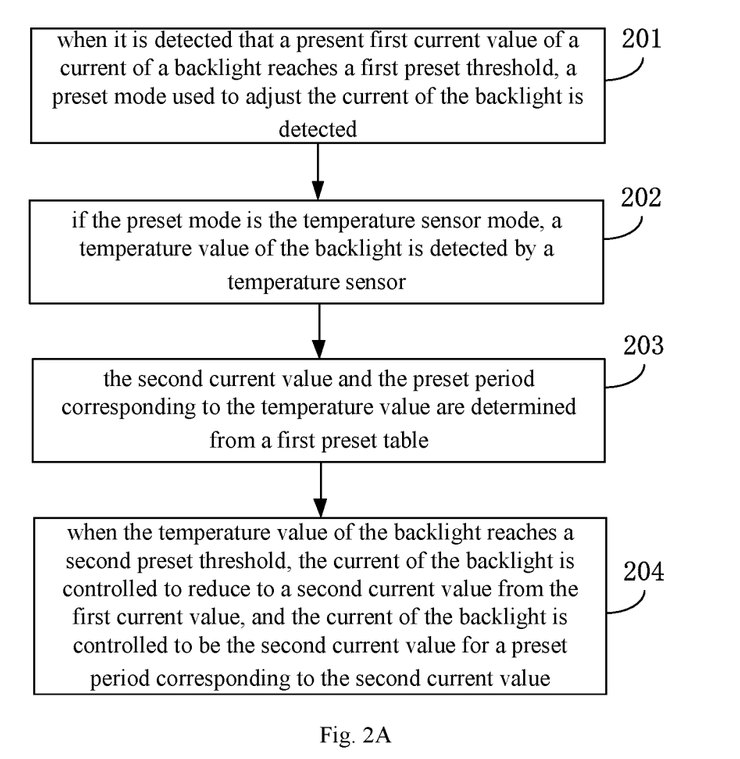
FIG. 2A is a flow chart illustrating a method for adjusting a current of a backlight according to another aspect of the disclosure.
Figure 2B:
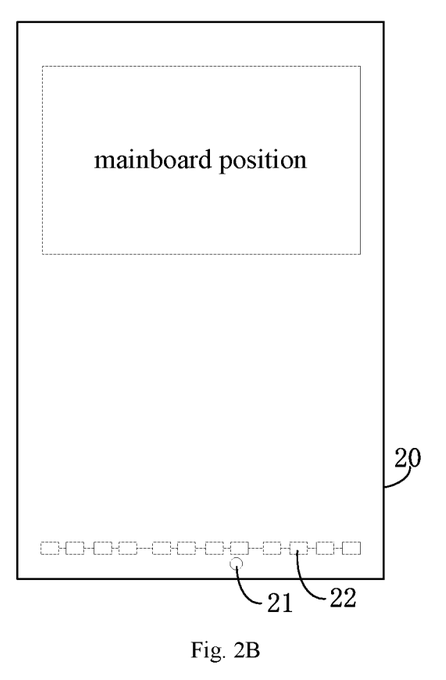
FIG. 2B is a schematic diagram illustrating a display apparatus according to an example.

FIG. 2A is a flow chart illustrating a method for adjusting a current of a backlight according to another aspect of the disclosure. FIG. 2B is a schematic diagram illustrating a display apparatus according to an example shown in FIG. 2A. This embodiment makes an exemplary description using the method provided by embodiments of the present disclosure, taking the temperature sensor mode as an example of the preset mode and taking a temperature value as an example of the reference value. As shown in FIG. 2A, the method may include following acts.

At block 201, when it is detected that a present first current value of the backlight reaches a first preset threshold, a preset mode used to adjust the current of the backlight is detected. Here, the display apparatus may determine that the present first current value of the backlight reaches the first preset threshold when the present first current value is greater than or equal to the first preset threshold.

Descriptions of block 201 may refer to descriptions in embodiments shown in FIG. 1, which is not described in detail herein.

At block 202, if the preset mode is the temperature sensor mode, a temperature value of the backlight is detected via a temperature sensor.

In one or more embodiments, as shown in FIG. 2B, in a display apparatus 20, the temperature sensor 21 may be arranged in a preset distance range from the backlight sequence 22. The preset distance range is set as far as to detect a temperature of the backlight sequence 22, such that the temperature of the backlight membrane may be detected in real time.

At block 203, the second current value and the preset period corresponding to the temperature value are determined from a first preset table. The second current value is a preset value. The first preset table is used to record correspondence relationships between current values applied to the backlight when backlight membrane is at different temperatures and lasting periods corresponding to the current values.

In one or more embodiments, a first preset table corresponding to the backlight membrane may be obtained by experiments. The first preset table may be stored locally on the display apparatus or stored remotely in a storage accessible to the display apparatus. The current of the backlight is controlled to drive the backlight by a high current value according to correspondence relationships among preset temperatures, current values, and lasting periods of the current values recorded in first preset table, and the backlight is controlled to remain in the high-light state. The preset temperature recorded in the first preset table is a reasonable temperature that the backlight membrane may withstand when the backlight is drove to bright up. A format of the first preset table may be seen in Table 1.

TABLE 1

| Temperature value (degree Celsius) | Current value (mA) | Preset period (minute) |
| --- | --- | --- |
| A1 | B1 | C1 |
| A2 | B2 | C2 |
| A3 | B3 | C3 |

Each of A1-C3 in above Table 1 represents a figure having a corresponding physical significance. Specific figures may be obtained by performing an experiment on a temperature that the backlight membrane may withstand in a given period (which may be regarded as the preset period in the present disclosure) and under different current values.

At block 204, when the temperature value of the backlight reaches a second preset threshold, the current of the backlight is controlled to reduce to a second current value from the first current value, and the current of the backlight is controlled to keep the second current value for a preset period corresponding to the second current value. The second current value is greater than first preset threshold. Here, the display apparatus may determine that the temperature value of the backlight reaches the second preset threshold when the temperature value is greater than or equal to the second preset threshold.

For example, when the backlight membrane is at 50 degrees Celsius, it may withstand a current value of 25 mA for a preset period of 30 minutes. Then, when it is detected that the preset mode is the temperature sensor mode, the current of the backlight may be controlled to reduce to 25 mA from 30 mA, and the backlight is in the high-light state for 30 minutes with a current of 25 mA.

Besides having the advantageous technical effects of the embodiment shown in FIG. 1, the temperature of the backlight membrane is detected via the temperature sensor. When the temperature is too high, the current of the backlight may be adjusted to reduce to the second current value from the first current value. Since the second current value may be obtained by experiments according to a property of a tolerable temperature of the backlight membrane, membranes using different materials may have different currents of the backlight and different preset periods, and thus the membranes using different materials may operate at an optimized high-light state as far as possible.

Figure 3:
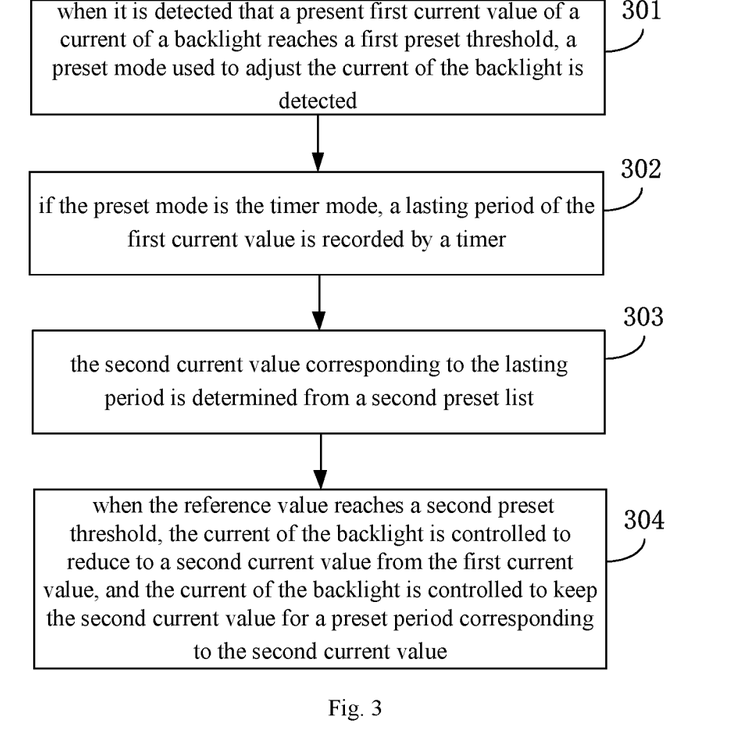
FIG. 3 is a flow chart illustrating a method for adjusting a current of a backlight according to yet another aspect of the disclosure.

FIG. 3 is a flow chart illustrating a method for adjusting backlight current according to yet another aspect of the disclosure. This embodiment makes an exemplary description using the method provided by embodiments of the present disclosure, taking the timer mode as an example of the preset mode, and taking a lasting period as an example of the reference value. As shown in FIG. 3, the method includes followings.

At block 301, when it is detected that a present first current value of the backlight reaches a first preset threshold, a preset mode used to adjust the current of the backlight is detected. The present first current value may be detected in real time using a current sensor.

Descriptions of block 301 may refer to descriptions in embodiments shown in FIG. 1, which is not described in detail herein.

At block 302, if the preset mode is the timer mode, a lasting period of the first current value is recorded by a timer.

In one or more embodiments, the lasting period of the first current value may be recorded by a timer in a backlight control circuit. The backlight control circuit may also record a value of the current of the backlight and preset periods for which the current of the backlight may keep different current values, thus realizing a real-time control of the backlight.

At block 303, the second current value corresponding to the lasting period is determined from a second preset table. The second preset table is used to record correspondence relationships between current values applied to the backlight and lasting periods corresponding to the current values.

In one or more embodiments, a second preset table corresponding to the backlight membrane may be obtained by experiments. The second preset table may be stored locally on the display apparatus or stored remotely in a storage accessible to the display apparatus. The second preset table is used to record a correspondence relationship between each current value and a preset period keeping the current value. The correspondence relationship may prevent a temperature of the membrane from being too high due to excessive heat produced by the current of the backlight and ensure the backlight remaining in a high-light state. A format of the second preset table may be seen in Table 2.

TABLE 2

| Current value (mA) | Preset period (minute) |
|---|---|
| D1 | E1 |
| D2 | E2 |
| D3 | E3 |

Each of D1-E3 in above Table 2 represents a figure having a corresponding physical significance. Specific figures may be obtained by recording a temperature that the backlight membrane may withstand in a given period (which may be regarded as the preset period in the present disclosure) and under different current values, and data in Table 2 may be obtained by experiments.

At block 304, when the reference value reaches a second preset threshold, the current of the backlight is controlled to reduce to a second current value from the first current value, and the current of the backlight is controlled to keep the second current value for a preset period corresponding to the second current value. The second current value is greater than first preset threshold.

For example, when the first current value of the current of the backlight is 30 mA, and the first current value lasts for a preset period of 30 minutes, if the second threshold value is 30 minutes, it needs to find the second current value to be adjusted from the second preset table. For example, if the second current value is 25 mA, the current of the backlight may be controlled to reduce to 25 mA from 30 mA. If a preset period corresponding to 25 mA is 10 minutes, the backlight is drove by a current of a backlight of 25 mA for 10 minutes.

Besides having the advantageous technical effects of the embodiment shown in FIG. 1, the temperature of the backlight membrane may be detected by the temperature sensor, when the temperature is too high, the current of the backlight may be further adjusted to reduce from the first current value to the second current value. Since the second current value may be obtained by experiments according to a property of a tolerable temperature of the backlight membrane, membranes using different materials may have different currents of backlight and different preset periods, thus the membranes using different materials may operate at an optimized high-light state as far as possible.

Figure 4:
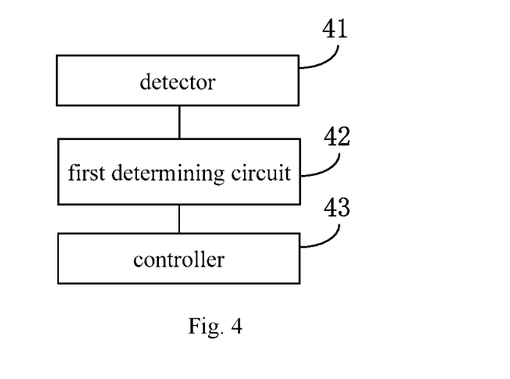
FIG. 4 is a block diagram of a device for adjusting a current of a backlight according to an aspect of the disclosure.

FIG. 4 is a block diagram of a device for adjusting a current of a backlight according to an aspect of the disclosure. As shown in FIG. 4, the device for adjusting a current of a backlight includes a detector 41, a first determining circuit 42, and a controller 43.

The detector 41 is configured to detect a preset mode used to adjust backlight current when it is detected that a present first current value of the current of the backlight reaches a first preset threshold.

The first determining circuit 42 is configured to determine a reference value corresponding to the preset mode detected by the detector 41.

The controller 43 is configured to control the current of the backlight to reduce to a second current value from the first current value and control the current of the backlight to keep the second current value for a preset period corresponding to the second current value when the reference value determined by the first determining circuit 42 reaches a second preset threshold. The second current value is greater than the first preset threshold.

Figure 5:
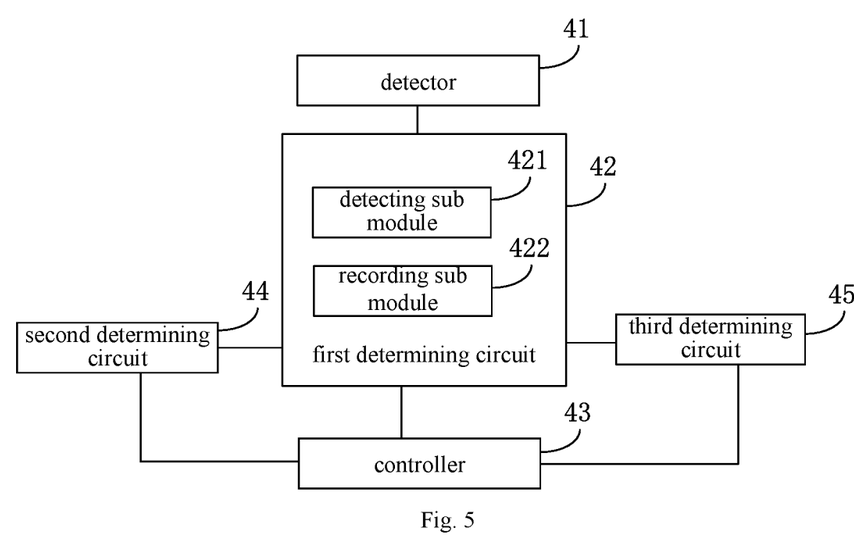
FIG. 5 is a block diagram of a device for adjusting a current of a backlight according to another aspect of the disclosure.

FIG. 5 is a block diagram of a device for adjusting a current of a backlight according to another aspect of the disclosure. As shown in FIG. 5, based on the embodiment shown in FIG. 4, the first determining circuit 42 may include a detecting sub module 421. Technical solutions of the present disclosure may avoid the excessive heat produced due to the backlight in a high current state for a long time.

The detecting sub module 421 is configured to detect a temperature value of the backlight via a temperature sensor if the preset mode detected by the detector 41 is a temperature sensor mode. The temperature value is the reference value.

In one or more embodiments, the device may further include a second determining circuit 44.

The second determining circuit 44 is configured to determine the second current value and the preset period corresponding to the temperature value detected by the detecting sub module 421 from a first preset table. The first preset table is used to record correspondence relationships between current values applied to the backlight when backlight membrane is at different temperatures and lasting periods corresponding to the current values.

In one or more embodiments, the first determining circuit 42 may include a recording sub module 422.

The recording sub module 422 is configured to record a lasting period of the first current value by a timer if the preset mode detected by the detector 41 is a timer mode. The lasting period is the reference value.

In one or more embodiments, the device may further include a second determining circuit 45.

The third determining circuit 45 is configured to determine the second current value corresponding to the lasting period recorded by the recording sub module 422 from a second preset table. The second current value is a preset value. The second preset table is used to record correspondence relationships between current values applied to the backlight when the current of the backlight is in different lasting periods and lasting periods corresponding to the current values.

With respect to the devices in the above embodiments, the specific manners for performing operations for individual modules therein have been described in detail in the embodiments regarding the embodiments of the related methods, which will not be elaborated herein.

Figure 6:
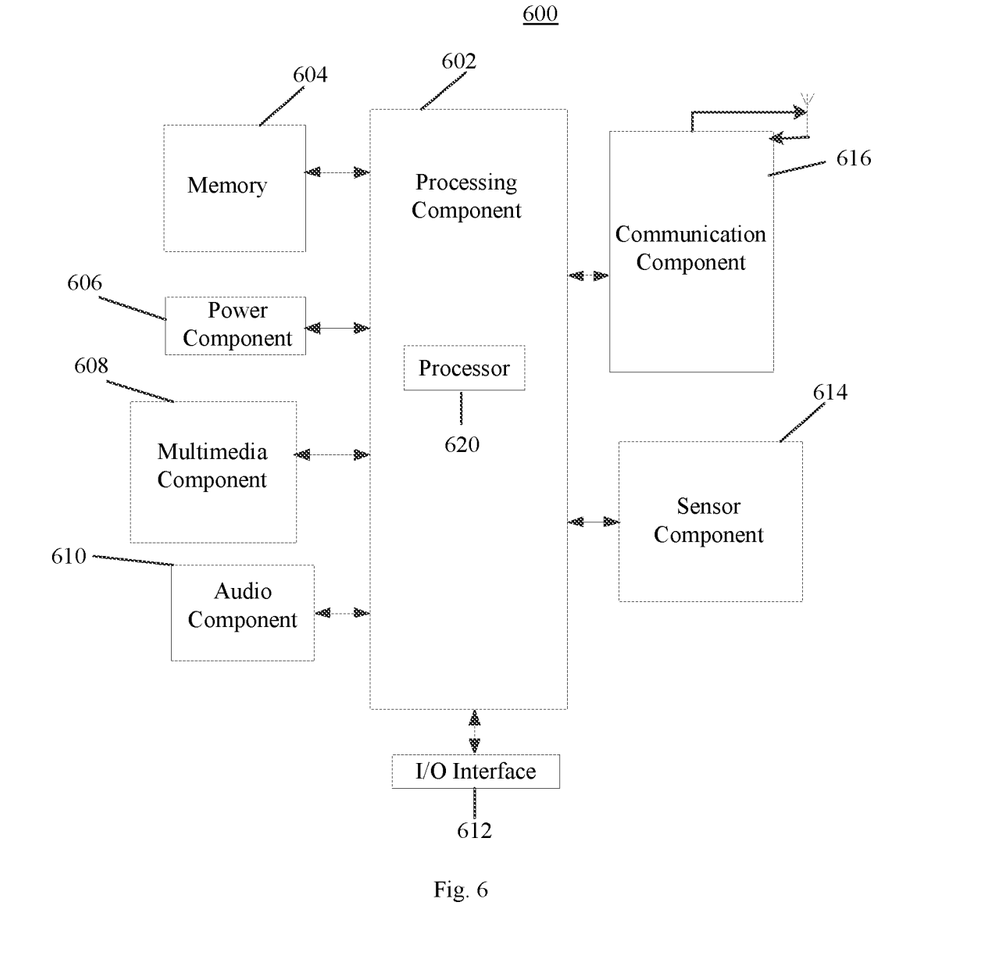
FIG. 6 is a block diagram of a device applied to adjusting a current of a backlight according to an aspect of the disclosure.

FIG. 6 is a block diagram of a device applied to adjusting a current of a backlight according to an aspect of the disclosure. For example, the device 600 may be a display apparatus that may display contents according to the current of the backlight, such as a mobile phone, a computer, a digital broadcast terminal, a messaging device, a gaming console, a tablet, a medical device, exercise equipment, a personal digital assistant, and the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 may access a wireless network based on a communication standard, such as WiFi, 2G, or 3G, or a combination thereof. In one aspect of the disclosure, the communication component 616 receives a broadcast signal or broadcast associated information from an external broadcast management system via a broadcast channel. In one aspect of the disclosure, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In aspect of the disclosures, the device 600 may be implemented with one or more circuitry, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The device 600 may use the circuitry in combination with the other hardware or software components for executing the method above. Each module, sub-module, unit, or sub-unit disclosed above may be implemented at least partially using the one or more circuitries.

In aspect of the disclosures, there is also provided a non-transitory computer-readable storage medium including instructions, such as included in the memory 604, executable by the processor 620 in the device 600, for performing the above methods. For example, the non-transitory computer-readable storage medium may be a ROM, a RAM, a CD-ROM, a magnetic tape, a floppy disc, an optical data storage device, and the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention only be limited by the appended claims.

What is claimed is:

1. A method for adjusting a current of a backlight, comprising:
    detecting a preset mode used to adjust the current of the backlight in response to determining that a present first current value of the current of the backlight reaches a first preset threshold,
    wherein the first preset threshold is determined by a current value of the current of the backlight controlled to be in a high brightness state, and is set to be equal to or greater than a lower limit value of a range of the current value of the current of the backlight in the high brightness state;
    determining a reference value corresponding to the preset mode;
    determining a second current value corresponding to the reference value and a preset period corresponding to the second current value from a preset table in response to the reference value reaching a second preset threshold; and
    controlling the current of the backlight to reduce to the second current value from the first current value, and controlling the current of the backlight to maintain the second current value for the preset period corresponding to the second current value, wherein the second current value is greater than the first preset threshold;
    wherein, the preset table corresponds to a backlight membrane of the backlight, and is used to record corresponding relationships between respective current values applied to the backlight and respective preset periods corresponding to the current values at preset reference values for the backlight membrane, to reflect a temperature that the backlight membrane is capable of withstanding in the corresponding preset period under different current values.

2. The method according to claim 1, wherein determining the reference value corresponding to the preset mode comprises:
    when the preset mode is a temperature sensor mode, obtaining a temperature value of the backlight from a temperature sensor and using the temperature value as the reference value.

3. The method according to claim 2, further comprising:
    determining the second current value and the preset period corresponding to the temperature value from a first preset table, wherein the first preset table is used to record correspondence relationships between current values applied to the backlight when backlight membrane is at different temperatures and lasting periods corresponding to the current values.

4. The method according to claim 1, wherein determining the reference value corresponding to the preset mode comprises:
    when the preset mode is a timer mode, obtaining a lasting period while the first current value is greater than or equal to the first preset threshold by a timer and using the lasting period as the reference value.

5. The method according to claim 4, further comprising:
    determining the second current value corresponding to the lasting period from a second preset table, wherein the second current value is a preset value, and the second preset table is used to record correspondence relationships between current values applied to the backlight when the current of the backlight is in different lasting periods and lasting periods corresponding to the current values.

6. A device for adjusting a current of a backlight, comprising:
    one or more processors;
    a memory storing instructions executable by the one or more processors;
    wherein the one or more processors are configured to:
    detect a preset mode used to adjust the current of the backlight in response to detection that a present first current value of the current of the backlight reaches a first preset threshold, wherein the first preset threshold is determined by a current value of the current of the backlight controlled to be in a high brightness state, and is set to be equal to or greater than a lower limit value of a range of the current value of the current of the backlight in the high brightness state;
    determine a reference value corresponding to the preset mode;
    determine a second current value corresponding to the reference value and a preset period corresponding to the second current value from a preset table in response to the reference value reaching a second preset threshold; and
    control the current of the backlight to reduce to the second current value from the first current value, and control the current of the backlight to maintain the second current value for the preset period corresponding to the second current value, when the reference value reaches a second preset threshold, wherein the second current value is greater than the first preset threshold,
    wherein the preset table corresponds to a backlight membrane of the backlight, and is used to record correspondence relationships between respective current values applied to the backlight and respective preset periods corresponding to the current values at preset reference values for the backlight membrane, to reflect a temperature that the backlight membrane is capable of withstanding in the corresponding preset period under different current value.

7. The device according to claim 6, wherein the one or more processors are configured to determine the reference value corresponding to the preset mode by an act of:
  detecting a temperature value of the backlight via a temperature sensor when the preset mode is a temperature sensor mode, in which the temperature value is the reference value.

8. The device according to claim 7, wherein the one or more processors are further configured to:
  determine the second current value and the preset period corresponding to the temperature value from a first preset table, wherein the first preset table is used to record correspondence relationships between current values applied to the backlight when backlight membrane is at different temperatures and lasting periods corresponding to the current values.

9. The device according to claim 6, wherein the one or more processors are configured to determine the reference value corresponding to the preset mode by an act of:
  recording a lasting period of the first current value by a timer when the preset mode detected by the detector is a timer mode, in which the lasting period is the reference value.

10. The device according to claim 9, wherein the one or more processors are further configured to:
  determine the second current value corresponding to the lasting period recorded by the recording sub module from a second preset table, wherein the second current value is a preset value, and the second preset table is used to record correspondence relationships between current values applied to the backlight when the current of the backlight is in different lasting periods and lasting periods corresponding to the current values.

11. A non-transitory computer-readable storage medium having stored therein instructions that, when executed by a processor of a device, cause the processor to perform a method for adjusting a current of a backlight, the method comprising:
  detecting a preset mode used to adjust the current of the backlight in response to determining that a present first current value of the current of the backlight reaches a first preset threshold, wherein the first preset threshold is determined by a current value of the current of the backlight controlled to be in a high brightness state, and is set to be equal to or greater than a lower limit value of a range of the current value of the current of the backlight in the high brightness state;
  determining a reference value corresponding to the preset mode;
  determining a second current value corresponding to the reference value and a preset period corresponding to the second current value from a preset table in response to the reference value reaching a second preset threshold; and
  controlling the current of the backlight to reduce to the second current value from the first current value, and controlling the current of the backlight to maintain the second current value for the preset period corresponding to the second current value, wherein the second current value is greater than the first preset threshold,
  wherein, the preset table corresponds to a backlight membrane of the backlight, and is used to record corresponding relationships between respective current values applied to the backlight and respective preset periods corresponding to the current values at preset reference values for the backlight membrane, to reflect a temperature that the backlight membrane is capable of withstanding in the corresponding preset period under different current values.

12. The non-transitory computer-readable storage medium according to claim 11, wherein determining the reference value corresponding to the preset mode comprises:
  when the preset mode is a temperature sensor mode, detecting a temperature value of the backlight by a temperature sensor, in which the temperature value is the reference value.

13. The non-transitory computer-readable storage medium according to claim 12, wherein the method further comprises:
  determining the second current value and the preset period corresponding to the temperature value from a first preset table, wherein the first preset table is used to record correspondence relationships between current values applied to the backlight when backlight membrane is at different temperatures and lasting periods corresponding to the current values.

14. The non-transitory computer-readable storage medium according to claim 11, wherein determining the reference value corresponding to the preset mode comprises:
  when the preset mode is a timer mode, recording a lasting period of the first current value by a timer, in which the lasting period is the reference value.

15. The non-transitory computer-readable storage medium according to claim 14, wherein the method further comprises:
  determining the second current value corresponding to the lasting period from a second preset table, wherein the second current value is a preset value, and the second preset table is used to record correspondence relationships between current values applied to the backlight when the current of the backlight is in different lasting periods and lasting periods corresponding to the current values.

* * * * *